(12) United States Patent
Sato et al.

(10) Patent No.: US 11,199,676 B2
(45) Date of Patent: Dec. 14, 2021

(54) MANUFACTURING METHOD OF OPTICAL FIBER CABLE AND MANUFACTURING APPARATUS OF OPTICAL FIBER CABLE

(71) Applicant: FUJIKURA LTD., Tokyo (JP)

(72) Inventors: Shinnosuke Sato, Sakura (JP); Kouji Tomikawa, Sakura (JP); Ken Osato, Sakura (JP)

(73) Assignee: FUJIKURA LTD., Tokyo (JP)

( * ) Notice: Subject to any disclaimer, the term of this patent is extended or adjusted under 35 U.S.C. 154(b) by 148 days.

(21) Appl. No.: 16/490,168

(22) PCT Filed: Mar. 15, 2018

(86) PCT No.: PCT/JP2018/010135
§ 371 (c)(1),
(2) Date: Aug. 30, 2019

(87) PCT Pub. No.: WO2018/190065
PCT Pub. Date: Oct. 18, 2018

(65) Prior Publication Data
US 2020/0003979 A1    Jan. 2, 2020

(30) Foreign Application Priority Data

Apr. 14, 2017  (JP) .............................. JP2017-080438

(51) Int. Cl.
*G02B 6/44* (2006.01)
*B29D 11/00* (2006.01)

(52) U.S. Cl.
CPC ........ *G02B 6/449* (2013.01); *B29D 11/00663* (2013.01)

(58) Field of Classification Search
None
See application file for complete search history.

(56) References Cited

U.S. PATENT DOCUMENTS

| | | | |
|---|---|---|---|
| 4,214,430 A * | 7/1980 | Vogelsberg | G02B 6/449 57/293 |
| 4,993,804 A * | 2/1991 | Mayr | G02B 6/4401 385/103 |

(Continued)

FOREIGN PATENT DOCUMENTS

| CN | 85103881 A | 11/1986 |
|---|---|---|
| CN | 87103422 A | 11/1987 |

(Continued)

OTHER PUBLICATIONS

International Search Report issued in corresponding International Application No. PCT/JP2018/010135 dated Apr. 17, 2018 (1 page).

(Continued)

*Primary Examiner* — Rhonda S Peace
(74) *Attorney, Agent, or Firm* — Osha Bergman Watanabe & Burton LLP (57) ABSTRACT

An optical fiber cable manufacturing method using a manufacturing apparatus including an SZ twisting device, an extrusion molding device, and a pressing portion disposed between the SZ twisting device and the extrusion molding device is provided. The method including: twisting optical fibers or optical fiber units in an SZ manner using the SZ twisting device to form an optical fiber bundle; and covering the optical fiber bundle with a sheath using the extrusion molding device while pressing the optical fiber bundle using the pressing portion.

9 Claims, 6 Drawing Sheets

(56) References Cited

U.S. PATENT DOCUMENTS

| | | | | |
|---|---|---|---|---|
| 5,283,014 | A | * | 2/1994 | Oestreich ............... G02B 6/449 156/172 |
| 5,751,879 | A | | 5/1998 | Graham et al. |
| 5,826,419 | A | | 10/1998 | Shelander et al. |
| 5,857,255 | A | * | 1/1999 | Wichmann ............. B23K 31/02 29/458 |
| 6,318,061 | B1 | * | 11/2001 | Schneider ............. G02B 6/449 57/7 |
| 6,584,251 | B1 | * | 6/2003 | Ardouin ................. G02B 6/449 385/100 |
| 7,192,541 | B2 | * | 3/2007 | Ardouin ................. G02B 6/449 264/1.29 |
| 7,200,307 | B2 | * | 4/2007 | Baul .................... G02B 6/4484 264/1.28 |
| 9,091,830 | B2 | * | 7/2015 | Blazer ................. G02B 6/4486 |
| 9,557,503 | B2 | | 1/2017 | Guenter et al. |
| 10,061,096 | B2 | * | 8/2018 | Takeda ................. G02B 6/4497 |
| 2003/0049002 | A1 | | 3/2003 | Bosisio et al. |
| 2003/0202758 | A1 | * | 10/2003 | Ardouin ................. G02B 6/449 385/111 |
| 2015/0086168 | A1 | * | 3/2015 | Blazer ................. G02B 6/4413 385/102 |
| 2017/0153404 | A1 | * | 6/2017 | Takeda ................. G02B 6/4433 |
| 2020/0003979 | A1 | * | 1/2020 | Sato ........................ B29C 48/05 |

FOREIGN PATENT DOCUMENTS

| | | |
|---|---|---|
| CN | 1301355 A | 6/2001 |
| CN | 103203854 A | 7/2013 |
| CN | 104407422 A | 3/2015 |
| CN | 105278066 A | 1/2016 |
| CN | 105793752 A | 7/2016 |
| CN | 105934695 A | 9/2016 |
| CN | 106448940 A | 2/2017 |
| CN | 106531297 A | 3/2017 |
| EP | 3282295 A1 | 2/2018 |
| JP | 2007-233252 A | 9/2007 |
| JP | 2009-237341 A | 10/2009 |
| JP | 4902580 B2 | 3/2012 |
| JP | 2013-037327 A | 2/2013 |
| JP | 2014-106380 A | 6/2014 |
| JP | 2017-021153 A | 1/2017 |
| WO | 99/30191 A1 | 6/1999 |
| WO | 2015/104853 A1 | 7/2015 |
| WO | 2016/163190 A1 | 10/2016 |

OTHER PUBLICATIONS

Office Action issued in corresponding Chinese Application No. 201880021169.1 dated Dec. 25, 2020 (6 pages).

Office Action issued in corresponding Chinese Patent Application No. 201880021169.1, dated Apr. 21, 2020 (22 pages).

* cited by examiner

MANUFACTURING METHOD OF OPTICAL FIBER CABLE AND MANUFACTURING APPARATUS OF OPTICAL FIBER CABLE

CROSS-REFERENCE TO RELATED APPLICATIONS

This is a National Stage application of International Application No. PCT/JP2018/010135 filed Mar. 15, 2018, which claims priority to Japanese Patent Application No. 2017-080438 filed Apr. 14, 2017. These references are incorporated herein by reference in their entirety.

TECHNICAL FIELD

The present invention relates to a manufacturing method of an optical fiber cable, and a manufacturing apparatus of an optical fiber cable.

BACKGROUND

In the related art, a manufacturing method of an optical fiber cable as disclosed in Patent Document 1 has been known. The manufacturing method of an optical fiber cable includes an SZ twisting step and a covering step. In the SZ twisting step, an optical fiber bundle is formed, by SZ twisting a plurality of optical fibers or a plurality of optical fiber units using an SZ twisting device. In the covering step, the optical fiber bundle is covered with a sheath, using an extrusion molding device.

Thus, since an optical fiber cable is manufactured by covering the optical fiber bundle twisted in an SZ manner with the sheath, for example, in a case where the optical fiber cable is wound around a drum, the tension and side pressure acting on the optical fiber can be reduced, and the transmission loss of the optical fiber can be improved.

PATENT LITERATURE

[Patent Document 1] Japanese Unexamined Patent Application, First Publication No. 2007-233252

Meanwhile, in recent years, the number of the optical fibers included in the optical fiber cable has been increasing, and it is necessary to accommodate a large number of optical fibers in a sheath, the optical fibers which is in a state of being twisted in an SZ manner. As described above, when a large number of optical fibers are twisted in an SZ manner, a force which the twisted optical fibers themselves tend to release its twist manner and return linearly due to their rigidity also increases. Therefore, a phenomenon called "untwisting" in which the optical fibers included in the SZ-twisted optical fiber bundle move in a direction in which the SZ twisting is released is likely to occur.

When the SZ twisting of the optical fiber bundle is released by the untwisting, the effect of reducing the tension and the side pressure acting on the optical fiber is weakened.

Therefore, it is conceivable to set the swing angle of the SZ twisting device large such that the SZ twisting of the optical fiber bundle is maintained even if the untwisting of the optical fiber bundle occurs. However, when the swing angle of the SZ twisting device is increased, the untwisting force acting on the optical fibers in the sheath and the amount of displacement of the optical fibers in the sheath also increase. The outer periphery of the SZ-twisted optical fiber bundle abuts on the inner peripheral surface of the sheath. Therefore, the sheath may be deformed due to such a large untwisting force or the displacement of the optical fibers, which may cause a meander of the optical fiber cable. The following may occur when the optical fiber cable is meandered. (1) The workability at the time of winding the optical fiber cable around the drum may be reduced. (2) The length of the optical fiber cable that can be wound around the drum may be shortened. (3) The workability at the time of installing an optical fiber cable may be reduced.

On the other hand, in order to prevent the optical fiber from untwisting in the sheath, it is also conceivable to wind a holding member around the optical fiber bundle for holding the SZ twisted manner of the optical fiber bundle.

However, in such a configuration, it is necessary to cover the optical fiber bundle with a sheath while the holding member is wound around the optical fiber bundle. In this case, the manufacturing apparatus becomes complicated, which causes an increase in manufacturing cost and the like.

SUMMARY

One or more embodiments of the present invention provide a manufacturing method of an optical fiber cable and a manufacturing apparatus of an optical fiber cable, capable of limiting untwisting of an SZ-twisted optical fiber bundle with a simple configuration.

A manufacturing method of an optical fiber cable according to one or more embodiments of the present invention includes an SZ twisting step of twisting a plurality of optical fibers or a plurality of optical fiber units in an SZ manner by an SZ twisting device, and forming an optical fiber bundle, and a covering step of covering the optical fiber bundle with a sheath by an extrusion molding device, and in the covering step, the optical fiber bundle is covered with the sheath while pressing the optical fiber bundle, by a pressing portion disposed between the SZ twisting device and the extrusion molding device.

A manufacturing apparatus of an optical fiber cable according to one or more embodiments of the present invention includes an SZ twisting device that twists a plurality of optical fibers or a plurality of optical fiber units in an SZ manner, and forms an optical fiber bundle; a pressing portion that is disposed downstream of the SZ twisting device, and presses the optical fiber bundle; and an extrusion molding device that is disposed downstream of the pressing portion and covers the optical fiber bundle with a sheath.

One or more embodiments of the present invention provide a manufacturing method of an optical fiber cable and a manufacturing apparatus of an optical fiber cable, capable of limiting untwisting of an SZ-twisted optical fiber bundle with a simple configuration.

DETAILED DESCRIPTION

First, a configuration example of an optical fiber cable manufactured by a manufacturing apparatus according to one or more embodiments will be described.

Figure 1:
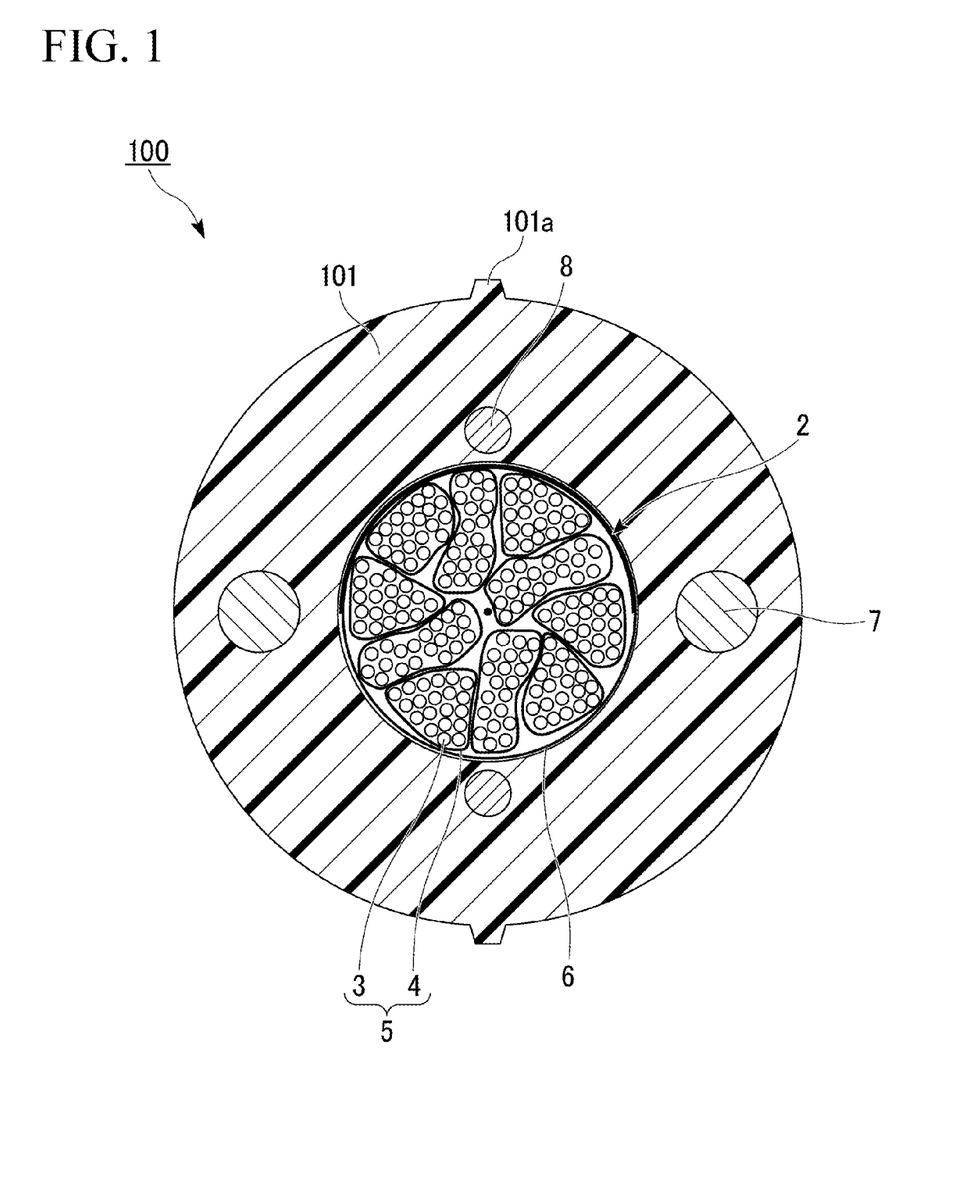
FIG. 1 is a cross-sectional view for explaining a configuration example of an optical fiber cable.

As shown in FIG. 1, an optical fiber cable 100 includes a core 2, a sheath 101 that covers the core 2, and a pair of tension members 7 and rip cords 8 embedded in the sheath 101. The optical fiber cable 100 is a high-density slotless-type optical fiber cable having, for example, 100 or more optical fibers 3 therein.

The core 2 includes a plurality of optical fiber units 5 and a wrapping tube 6. The plurality of optical fiber unit 5 each have a plurality of optical fibers 3. The wrapping tube 6 wraps the plurality of optical fiber units 5. For example, the wrapping tube 6 is formed of the PET film and the non-woven fabric. In addition, the wrapping tube 6 may be formed of a water-absorbent material such as a water-absorbent tape having water blocking properties.

As the optical fiber 3, an optical fiber core wire, an optical fiber strand, or the like can be used.

The optical fiber unit 5 includes a plurality of optical fibers 3 and a binding material 4 for bundling the optical fibers 3. The optical fiber unit 5 is a so-called intermittently-adhered optical fiber ribbon. In case of the optical fiber unit 5 is an intermittently-adhered optical fiber ribbon, the optical fibers 3 in the intermittently-adhered optical fiber ribbon are adhered to each other, so that when a plurality of optical fibers 3 is pulled in a direction orthogonal to the extending direction thereof, the optical fibers 3 spread in a mesh form (spider web shape). Specifically, one optical fiber 3 is bonded to the optical fibers 3 on both sides thereof at regular intervals in the longitudinal direction. In one optical fiber 3, a bonded portion bonded to the adjacent optical fiber 3 on one side and a bonded portion bonded to the adjacent optical fiber 3 on the other side are disposed at different positions in the longitudinal direction.

The optical fiber unit 5 included in the core 2 is not limited to the intermittently-adhered optical fiber ribbon, and may be changed as appropriate.

In addition, the plurality of optical fibers 3 may not be bundled by the binding material 4, and may be wrapped in the wrapping tube 6 without the binding material 4. In this case, although the core 2 may have a plurality of optical fibers, the core 2 may not have the optical fiber unit 5.

As the material of the sheath 101, polyolefin (PO) resin such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used. A pair of projections 101a extending along the entire length of the optical fiber cable 100 is formed on the outer peripheral surface of the sheath 101.

As the rip cord 8, a cylindrical rod made of PP, nylon, or the like can be used. Further, the rip cord 8 may be formed of yarns in which fibers of PP or polyester are twisted, and the rip cord 8 has water absorbency.

The pair of rip cords 8 is disposed with the core 2 interposed therebetween in the radial direction. The number of rip cords 8 embedded in the sheath 101 may be one or three or more.

As the material of the tension member 7, for example, a metal wire (such as steel wire), a tension fiber (such as aramid fiber), FRP or the like can be used.

A pair of tension members 7 is disposed with the core 2 interposed therebetween in the radial direction. The number of tension members 7 embedded in the sheath 101 may be one or three or more.

Next, the configuration of a manufacturing apparatus 10A for manufacturing the optical fiber cable 100 as described above will be described with reference to FIG. 2.

Figure 2:
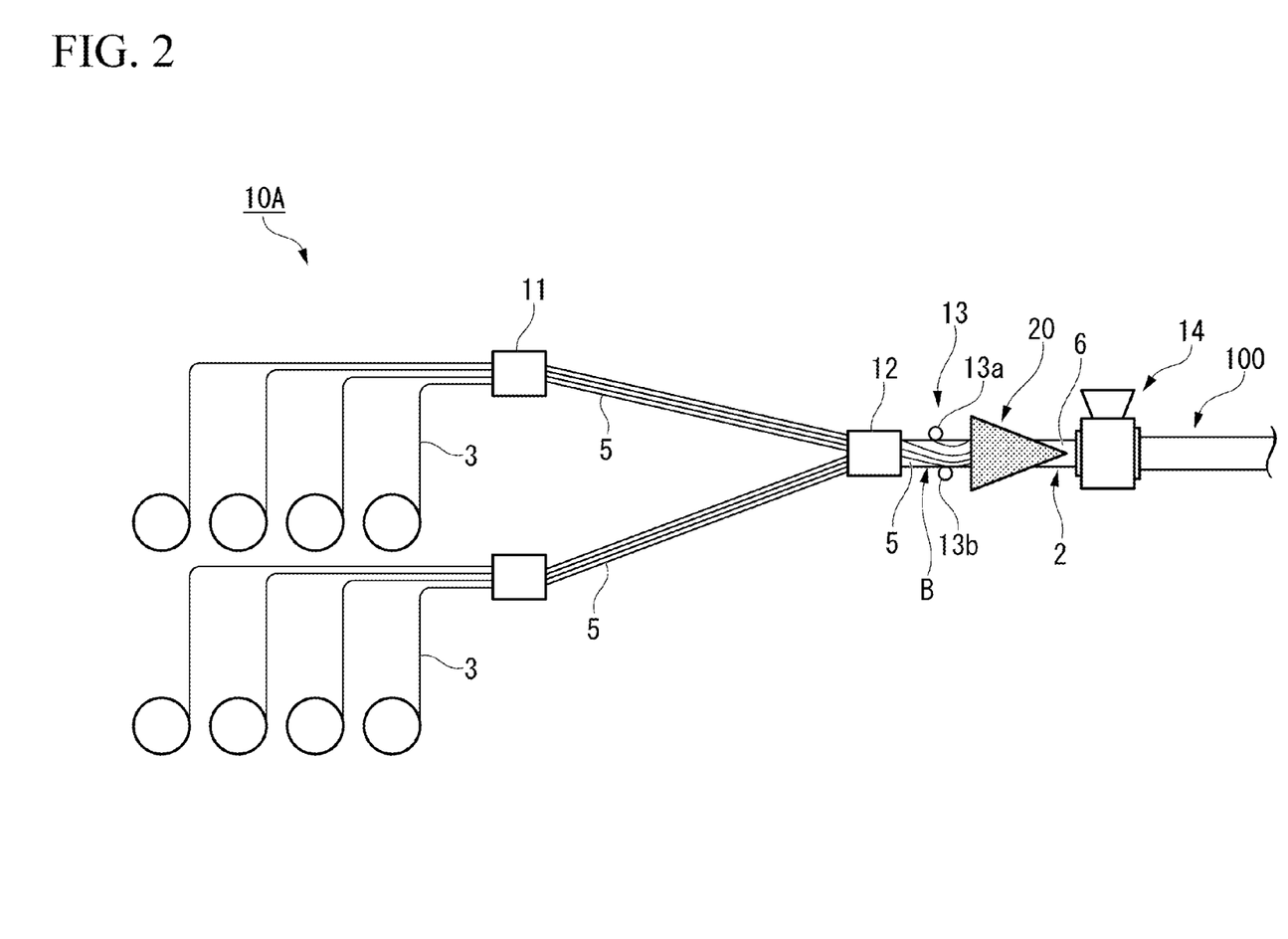
FIG. 2 is a schematic view showing a configuration of a manufacturing apparatus of an optical fiber cable of one or more embodiments.

As shown in FIG. 2, the manufacturing apparatus 10A includes a binding device 11, an SZ twisting device 12, a forming device 20, and an extrusion molding device 14. In addition, the manufacturing apparatus 10A includes feeding devices (not shown) for co-winding the rip cord 8 and the tension member 7 to the core 2, and embedding them in the sheath 101. These feeding devices may be disposed between the forming device 20 and the extrusion molding device 14. In this case, in order to secure a space for disposing the feeding devices, the distance between the forming device 20 and the extrusion molding device 14 or between the SZ twisting device 12 and the extrusion molding device 14 needs to be increased to some extent.

The binding device 11 binds the plurality of optical fibers 3 with the binding material 4 to form an optical fiber unit 5. In the case where the optical fiber unit 5 is an intermittently-adhered optical fiber ribbon, a bonding device for intermittently bonding the optical fibers 3 may be disposed on the upstream side of the binding device 11.

The SZ twisting device 12 is disposed on the downstream side of the binding device 11, and twists the plurality of optical fiber units 5 in an SZ manner to form an optical fiber bundle B.

The forming device 20 is disposed on the downstream side of the SZ twisting device 12, and forms the core 2 by co-winding the wrapping tube 6 around the optical fiber bundle B twisted in an SZ manner.

The extrusion molding device 14 is disposed on the downstream side of the forming device 20. The sheath 101 is extruded in a cylindrical shape around the core 2, and the core 2 is covered by the sheath 101 to form the optical fiber cable 100. After passing through the extrusion molding device 14, the inner peripheral surface of the sheath 101 is in contact with the outer periphery of the optical fiber bundle B, so the relative movement of the optical fibers 3 included in the optical fiber bundle B is restricted.

Here, on the downstream side of the SZ twisting device 12, due to the rigidity of the optical fiber 3 itself, "untwisting" may occur. The "untwisting" is a phenomenon that the optical fibers 3 included in the optical fiber bundle B move relative to each other in a direction that the SZ twisting tends to release. In particular, between the SZ twisting device 12 and the extrusion molding device 14, the inner peripheral surface of the sheath 101 is in a state before coming into contact with the outer periphery of the optical fiber bundle B. Therefore, relative movement of the optical fibers 3 is not restricted, and untwisting of the optical fiber bundle B tends to occur.

Therefore, the manufacturing apparatus 10A of one or more embodiments includes the pressing portion 13 (the optical fiber press) disposed between the SZ twisting device 12 and the forming device 20 for pressing the optical fiber bundle B. In the example of FIG. 2, two rollers (rotary bodies) 13a, 13b are provided as the pressing portion 13. The two rollers 13a, 13b are disposed so as to sandwich the optical fiber bundle B therebetween. Further, these two rollers 13a, 13b are disposed at mutually different positions in the longitudinal direction in which the optical fiber bundle B extends.

When the rollers 13a, 13b sandwich and press the optical fiber bundle B twisted in an SZ manner, relative movement of the optical fibers 3 included in the optical fiber bundle B is restricted, and untwisting is limited. In addition, since the rollers 13a, 13b rotate while pressing the optical fiber bundle B, the friction between the rollers 13a, 13b and the optical fiber bundle B becomes small, and the occurrence of damage or the like in the optical fiber 3 can be limited.

In addition, the pressing portion 13 may have one or three or more rollers. Even in a case where the pressing portion 13 has one roller, the optical fiber bundle B is pressed against the roller by the tension of the optical fiber bundle B located between the SZ twisting device 12 and the forming device 20, for example. Therefore, it is possible to limit untwisting by this pressing force.

In addition, as the pressing portion 13, a rotary body (for example, a belt or the like) other than the roller, or a structure (for example, a rod-like body or the like) which is not a rotary body may be used.

In the case of manufacturing the optical fiber cable 100 by the manufacturing apparatus 10A, first, the plurality of optical fibers 3 are bound by the binding device 11 to form the optical fiber unit 5 (binding step).

After the binding step, the plurality of optical fiber units 5 are SZ-twisted using the SZ twisting device 12 to form an optical fiber bundle B (SZ twisting step).

After the SZ twisting step, the optical fiber bundle B is wrapped with the wrapping tube 6 by the forming device 20 while pressing the optical fiber bundle B by the pressing portion 13, and the core 2 is formed (wrapping step).

After the wrapping step, the core 2 is covered with the sheath 101 by the extrusion molding device 14 (covering step). Thereby, the optical fiber cable 100 is obtained.

Next, one or more embodiments according to the present invention will be described, but the basic configuration is the same as that of the embodiments described above. Therefore, the same reference numerals are given to similar configurations, the explanation thereof will be omitted, and only differences will be described.

Figure 3:
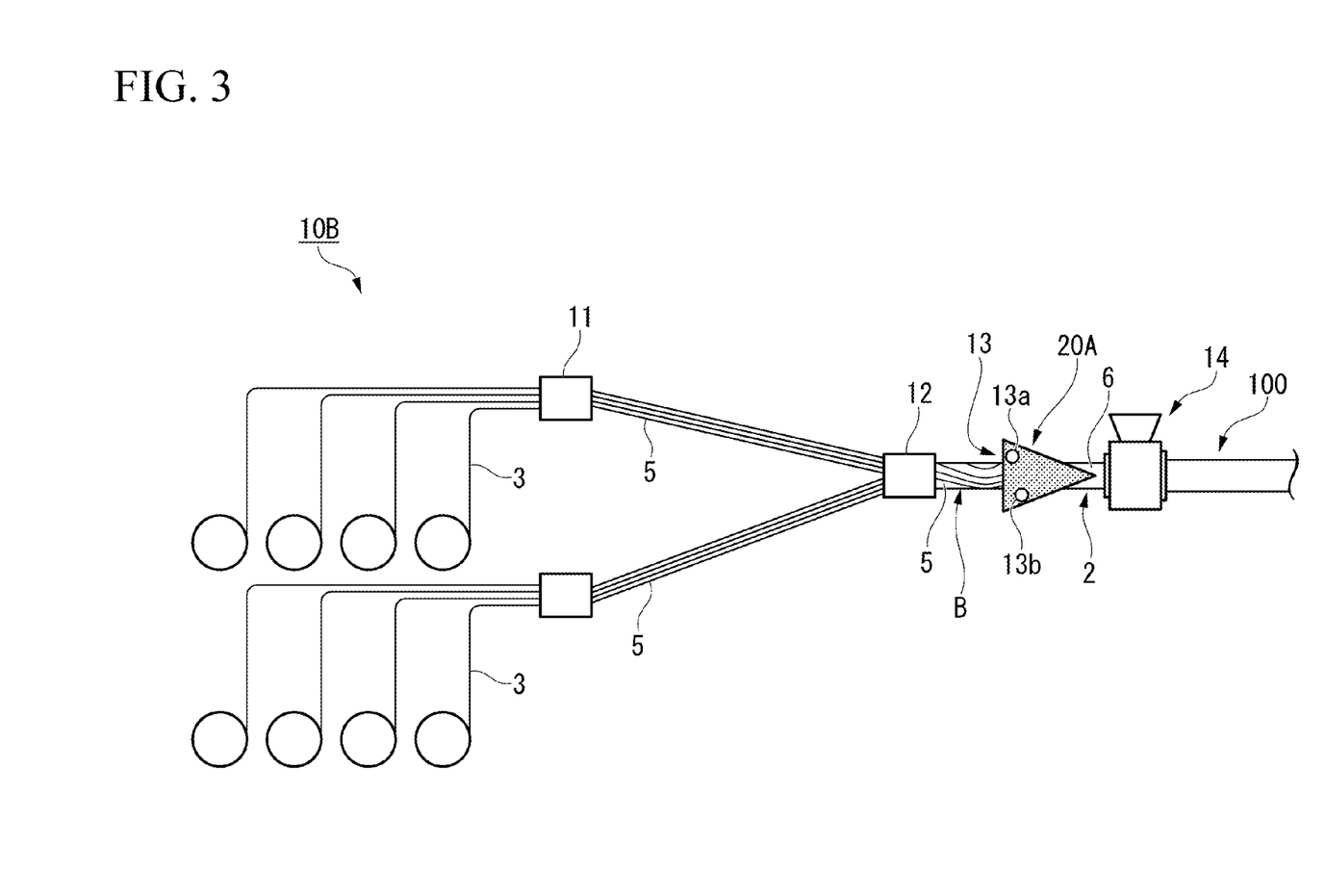
FIG. 3 is a schematic view showing a configuration of a manufacturing apparatus of an optical fiber cable of one or more embodiments.

A manufacturing apparatus 10B of one or more embodiments differs from the embodiments described above in that the pressing portion 13 and the forming device are integrated as shown in FIG. 3.

The configuration of a forming device 20A of one or more embodiments will be described with reference to FIGS. 4 and 5. Here, in one or more embodiments, an XYZ orthogonal coordinate system is set, and the positional relationship of each configuration will be described.

A X direction is a direction from the upstream side to the downstream side of the manufacturing apparatus 10B. A Z direction is the up-down direction. A Y direction is a direction orthogonal to both the X direction and the Z direction.

Figure 4:
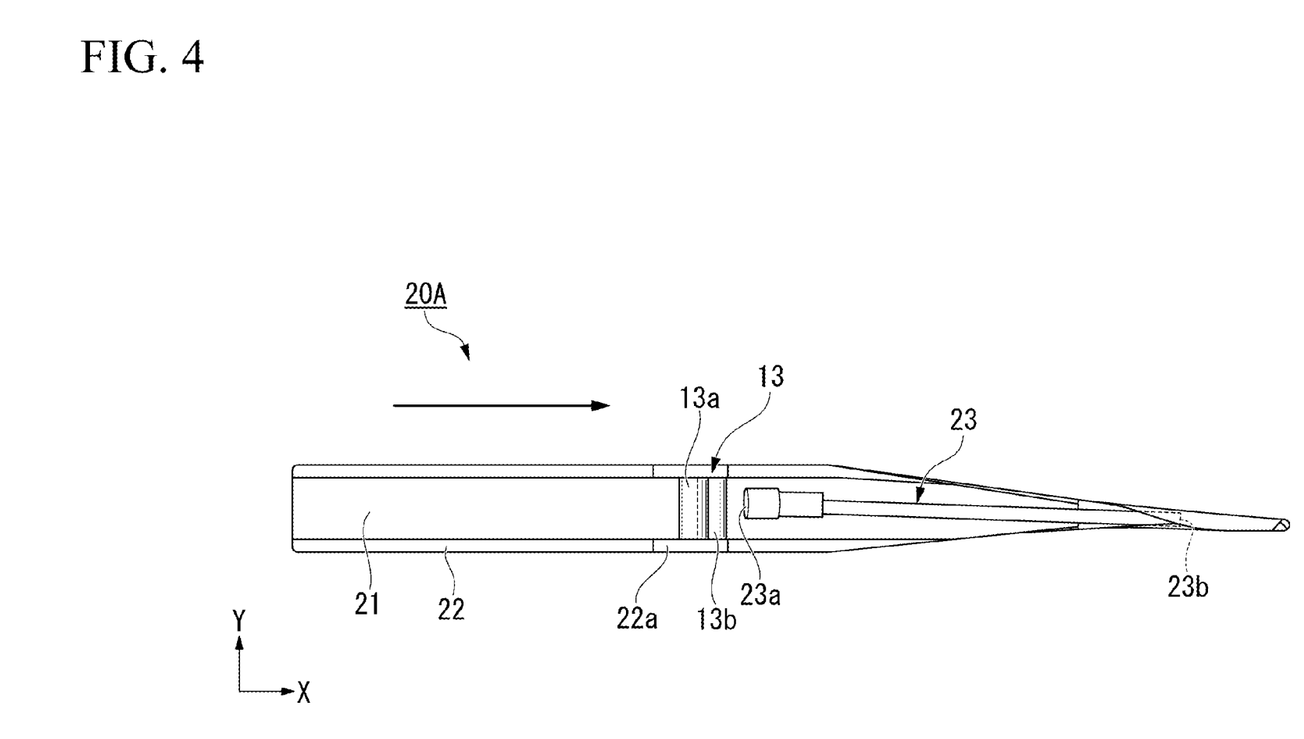
FIG. 4 is a plan view of a forming device according to one or more embodiments.

In FIG. 4, illustration of the optical fiber bundle B and the wrapping tube 6 is omitted.

Figure 5:
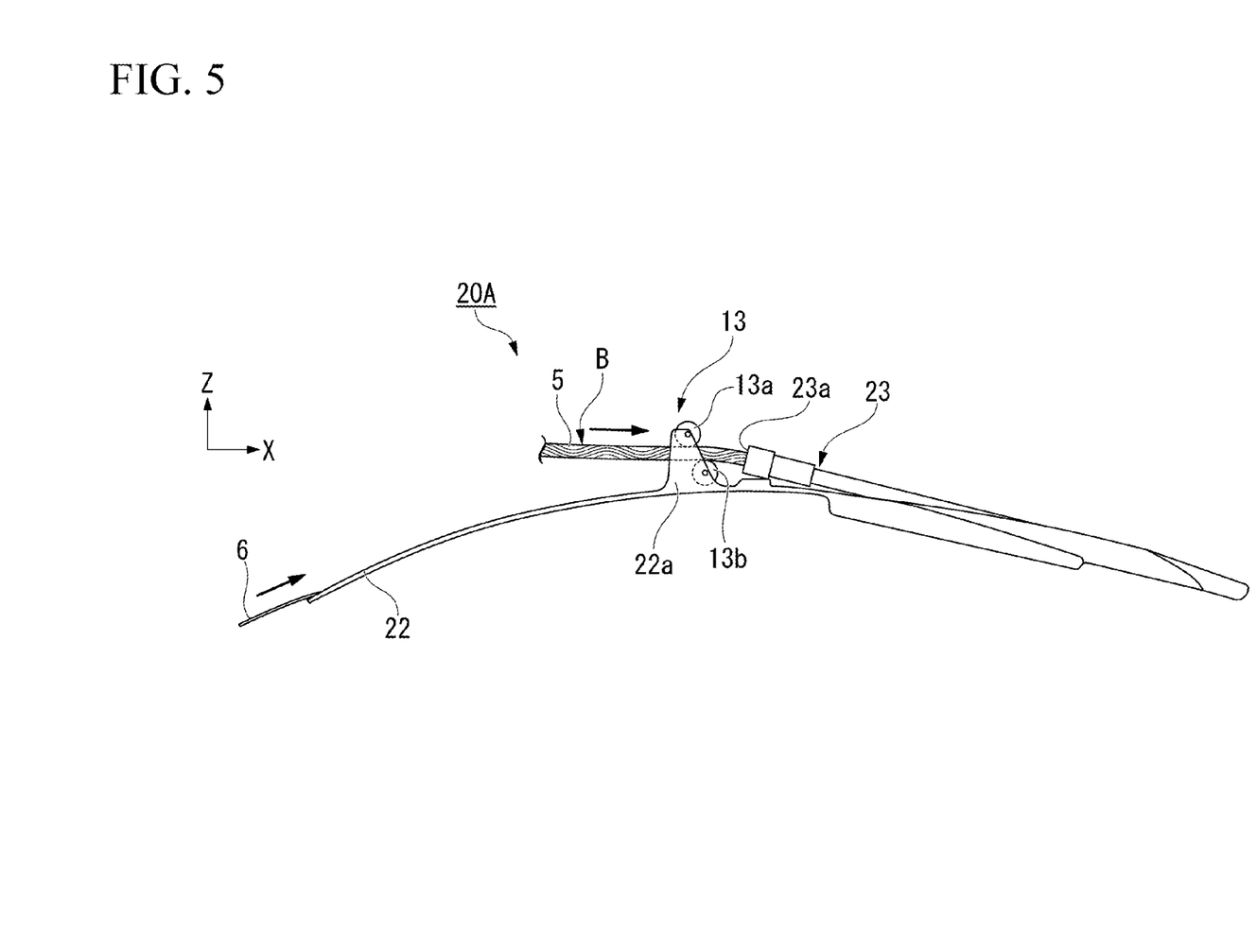
FIG. 5 is a side view of the forming device according to one or more embodiments.

As shown in FIGS. 4 and 5, the forming device 20A includes a guide portion 21 for guiding the wrapping tube 6, a pair of side walls 22 provided at both ends of the guide portion 21 in the Y direction, and a guide cylinder 23 for guiding the optical fiber bundle B. The wrapping tube 6 moves downstream along the guide portion 21.

An inlet 23a of the optical fiber unit 5 is provided at the upstream end of the guide cylinder 23. An outlet 23b of the optical fiber unit 5 is provided at the downstream end of the guide cylinder 23. The optical fiber unit 5 moves downstream in the guide cylinder 23 from the inlet 23a to the outlet 23b. The downstream end of the guide portion 21 is curved so as to wrap the outlet 23b of the guide cylinder 23. Therefore, the wrapping tube 6 moving downstream along the guide portion 21 is rounded so as to wrap the optical fiber bundle B that has passed through the outlet 23b of the guide cylinder 23.

Here, the pair of side walls 22 is provided with support wall portions 22a that rotatably support the rollers 13a, 13b, respectively. The support wall portion 22a is provided in the vicinity of the upstream side of the inlet 23a of the guide cylinder 23. The rollers 13a, 13b are rotatably supported by the pair of support wall portions 22a, respectively, and are disposed in the vicinity of the upstream side of the inlet 23a of the guide cylinder 23. As shown in FIG. 5, the upstream side of the guide portion 21 may be curved downward so as not to interfere with the optical fiber unit 5 going straight in the X direction.

Figure 6:
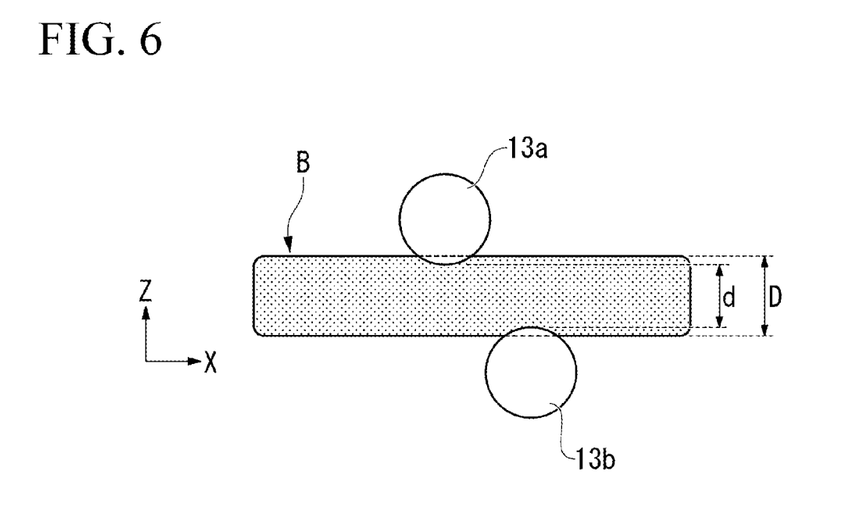
FIG. 6 is a schematic side view of a pressing portion.
Figure 7:
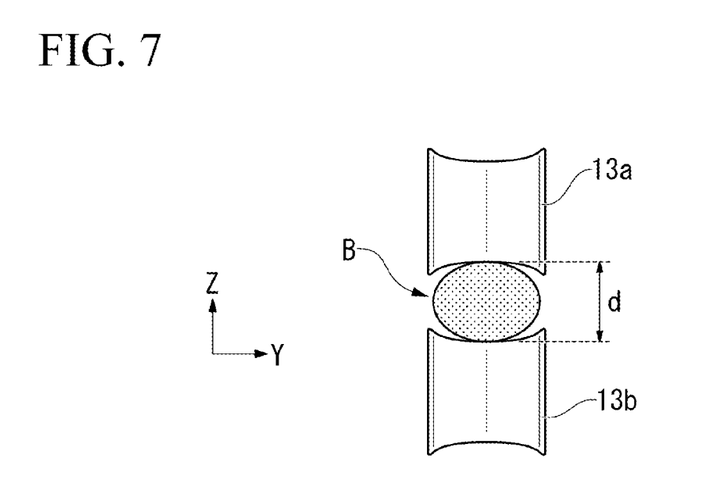
FIG. 7 is a schematic front view of the pressing portion.

FIG. 6 is an explanatory view of the pressing portion 13 in a side view seen from the Y direction, and FIG. 7 is an explanatory view of the pressing portion 13 in a front view seen from the X direction. As shown in FIGS. 6 and 7, the rollers 13a, 13b are each formed in a cylindrical shape extending in the Y direction. Further, as shown in FIG. 7, each roller 13a, 13b gradually increases in diameter from the central portion in the Y direction to both end portions in the Y direction. Thereby, in a front view (FIG. 7) viewed from the X direction, the distance between the roller 13a and the roller 13b is the longest at the central portion of each of the rollers 13a, 13b in the Y direction, and the distance between the roller 13a and the roller 13b becomes shorter gradually toward the both ends in the Y direction of each of the rollers 13a, 13b.

In one or more embodiments, the distance between the rollers 13a, 13b in a portion where the distance between the rollers 13a, 13b is the longest in the front view is referred to as an inter-roller distance d. Further, the diameter of the optical fiber bundle B before being pressed by the pressing portion 13, that is, the diameter of the optical fiber bundle before passing between the pair of rollers 13a, 13b is referred to as a bundle diameter D. As shown in FIG. 6, the inter-roller distance d is shorter than the bundle diameter D. Thereby, as shown in FIG. 7, the optical fiber bundle B is deformed into an elliptical shape in which the inter-roller distance d is a minor diameter in a front view. In addition, the rollers 13a, 13b are supported by the pair of support wall portions 22a such that the relative positions of the rollers do not change. Therefore, when the optical fiber bundle B passes between the rollers 13a, 13b and the optical fiber bundle B is pressed by the rollers 13a, 13b, the minor diameter of the optical fiber bundle B becomes equal to the inter-roller distance d. That is, the inter-roller distance d is the minor diameter of the optical fiber bundle passing between the pair of rollers 13a, 13b.

Hereinafter, the above embodiments will be described using specific examples. The following examples do not limit the present invention.

(144-Fiber Cable)

First, the results of manufacturing 144-fiber optical fiber cables according to the manufacturing conditions of Comparative Examples 1, 2 and Examples 1 to 3 shown in Table 1 will be described. Here, an optical fiber cable provided with 12 intermittently-adhered optical fiber ribbons each having 12 optical fibers is manufactured. That is, the optical fiber bundle B is formed by SZ twisting of 12 intermittently-adhered optical fiber ribbon. In addition, the setting angle shown in Table 1 means the range of the angle at which the SZ twisting device 12 is swung when a plurality of intermittently-adhered optical fiber ribbons is subjected to SZ twisting using the SZ twisting device 12. For example, in a case where the setting angle is ±350°, the SZ twisting device 12 repeats a swing motion in the CW direction by 350° and a swing motion in the CCW direction by 350°, thereby the intermittently-adhered optical fiber ribbons are subjected to SZ twisting. Further, the introduction angle shown in Table 1 indicates the angle of the SZ twisting actually given to the intermittently-adhered optical fiber ribbons, in a state in which the SZ-twisted intermittently-adhered optical fiber ribbons are accommodated in the sheath. The introduction angle is measured by cutting the optical fiber cable at predetermined intervals in the longitudinal direction after manufacturing the cable, and checking the position of a specific optical fiber or optical fiber unit in each cut surface. It indicates that the larger the difference between the setting angle and the introduction angle, the more the intermittently-adhered optical fiber ribbon is untwisted.

TABLE 1

|  | roller | setting angle(°) | introduction angle(°) | transmission loss | meander angle(°) | drum winding length(%) | comprehensive judgement |
|---|---|---|---|---|---|---|---|
| Comparative Example 1 | — | ±1000 | ±150 | OK | ±30 | 100 | C |
| Comparative Example 2 | — | ±600 | ±90 | NG | ±1 | 150 | C |
| Example 1 | 1 | ±500 | ±150 | OK | ±10 | 130 | B |
| Example 2 | 2 | ±350 | ±150 | OK | ±1 | 150 | A |
| Example 3 | 3 | ±300 | ±150 | OK | ±1 | 150 | A |

The transmission loss shown in Table 1 indicates the result when the transmission loss at a wavelength of 1.55 μm is measured by an optical time domain reflectometer (OTDR) in a state where each cable is wound around a drum. Specifically, OK (good) is described as good result in a case where the transmission loss is 0.25 dB/km or less, and NG (defect) is described as insufficient result in a case where the transmission loss exceeds 0.25 dB/km.

The meander angle shown in Table 1 indicates the magnitude of meander generated in the optical fiber cable. The meander angle is the range of the angle at which the projection 101a of the optical fiber cable rotates around the central axis of the optical fiber cable. For example, in a case where the meander angle is ±30°, it means that the projection 101a rotates within a range of ±30°, that is, 60°, around the central axis of the optical fiber cable.

The drum winding lengths shown in Table 1 show the results of relative comparison of the possible winding lengths when winding the optical fiber cable on the drum. Specifically, it shows a possible winding length at the time of winding the optical fiber cable of each condition with respect to a possible winding length at the time of winding the optical fiber cable of Comparative Example 1, on the same drum. For example, in a case where the drum winding length is 150%, it indicates that the optical fiber cable can be wound around the drum 1.5 times longer than the optical fiber cable of Comparative Example 1.

The comprehensive judgement shown in Table 1 indicates A (good) in a case where the results of the transmission loss, the meander angle and the drum winding length are good, B (within the allowable range) in a case where the results are within the allowable range, and C (defect) in a case where the results are insufficient.

As shown in Table 1, in Comparative Example 1, the roller as the pressing portion 13 is not provided, and the setting angle is ±1000°. As a result, the introduction angle is ±150°, and the result of the transmission loss is good. However, the meander angle is ±30°. As described above, the reason why the meander angle is increased is that the difference between the setting angle and the introduction angle is significantly increased because the roller as the pressing portion 13 is not provided, and the optical fiber bundle B is greatly untwisted in the sheath. Further, in the optical fiber cable of Comparative Example 1, the meander angle is large, so when the cable is wound around the drum, the gap between the adjacent optical fiber cables in the wound state is increased. Thereby, the length of the optical fiber cable that can be wound around the drum is smaller than that of the cable manufactured according to the other manufacturing conditions.

As shown in Table 1, in Comparative Example 2, the roller as the pressing portion 13 is not provided, and the setting angle is ±600°. As a result, the introduction angle is ±90°, and the result of the transmission loss is insufficient. The meander angle is ±1°, and the drum winding length is 150% of that of Comparative Example 1. As described above, the result of the transmission loss is insufficient because the introduction angle is ±90° and small. In other words, this is because the angle of the SZ twisting of the optical fiber bundle B in the sheath is small, so the effect of reducing the tension and the side pressure generated in the optical fiber when the optical fiber cable is wound around the drum is limited.

As shown in Table 1, in Example 1, one roller is provided as the pressing portion 13, and the setting angle is ±500°. As a result, the introduction angle is ±150°, and the result of the transmission loss is good. The meander angle is ±10°, and the drum winding length is 130% of that of Comparative Example 1. Comparing Comparative Example 1 with Example 1, the introduction angles are equal even though the setting angles are largely different. This means that the untwisting of the optical fiber bundle B is limited by one roller provided as the pressing portion 13 when manufacturing Example 1. On the other hand, comparing Comparative Example 2 with Example 1, the drum winding length is smaller in Example 1. This is because the meander angle in Example 1 is larger than the meander angle in Comparative Example 2, so the gap between the adjacent optical fiber cables is relatively large in the state where the optical fiber cable is wound around the drum.

As shown in Table 1, in Example 2, two rollers are provided as the pressing portion 13, and the setting angle is ±350°. As a result, the introduction angle is ±150°, and the result of the transmission loss is good. The meander angle is ±1°, and the drum winding length is 150% of that of Comparative Example 1. Comparing Example 1 with Example 2, it can be seen that the setting angle required to realize the same introduction angle is smaller in Example 2. This means that the effect of limiting the untwisting of the optical fiber bundle B is further increased by increasing the number of rollers as the pressing portion 13. Further, in Example 2, the difference between the setting angle and the introduction angle is smaller than that in Example 1, the meander angle is also limited to be small. As a result, the gap between the adjacent optical fiber cables in the state in which the optical fiber cable is wound around the drum is smaller in Example 2 than Example 1. This makes it possible to wind the optical fiber cable around the drum at a higher density. Therefore, the drum winding length of Example 2 is larger than the drum winding length of Example 1.

As shown in Table 1, in Example 3, three rollers are provided as the pressing portion 13, and the setting angle is ±300°. As a result, the introduction angle is ±150°, and the result of the transmission loss is good. The meander angle is ±1°, and the drum winding length is 150% of that of Comparative Example 1. Comparing Example 2 with Example 3, the difference between the setting angle and the introduction angle is smaller in Example 3. This means that the effect of limiting the untwisting of the optical fiber bundle B is further increased by further increasing the number of rollers as the pressing portion 13 with respect to the configuration of Example 2.

In addition, comparing Examples 1 to 3, the effect of limiting untwisting is greatly improved by increasing the number of rollers from one to two, and the effect of limiting untwisting is further improved by increasing the number of rollers from two to three. However, when the number of rollers is increased, the improvement of the effect of preventing untwisting can be expected as described above, but the dedicated area of the pressing portion 13 also increases accordingly. Therefore, the number of rollers to be disposed may be increased or decreased depending on the required performance of the optical fiber cable.

(432-Fiber Cable)

Next, the results of manufacturing 432-fiber optical fiber cables according to the manufacturing conditions of Comparative Examples 3, 4 and Examples 4 to 6 shown in Table 2 will be described. Here, six intermittently-adhered optical fiber ribbons each having 12 optical fibers are bound with a binding material to form one unit. An optical fiber cable having six units is manufactured. That is, the optical fiber bundle B is formed by SZ twisting of six optical fiber units. Other conditions are the same as those described in the description of Table 1.

a larger number of optical fibers than Comparative Example 1, so the rigidity of the optical fiber bundle B is also increased, and untwisting is likely to occur. Further, the difference between the setting angle and the introduction angle is larger in Comparative Example 3 than in Comparative Example 1. Thereby, the force of untwisting the optical fiber after being accommodated in the sheath 101 is increased, and the sheath 101 subjected to this untwisting force is deformed more greatly. As a result, the meander angle is larger in Comparative Example 3 than in Comparative Example 1.

As shown in Table 2, in Comparative Example 4, the roller as the pressing portion 13 is not provided, and the setting angle is ±600°. As a result, the introduction angle is ±70°, and the result of the transmission loss is insufficient. The meander angle is ±1°, and the drum winding length is 160% of that of Comparative Example 3. The reason why the introduction angle of Comparative Example 4 is smaller than the introduction angle of Comparative Example 2 is that the optical fiber bundle B is likely to untwist because the number of optical fibers in the optical fiber bundle B is larger in Comparative Example 4 than in Comparative Example 2.

In Example 4, one roller is provided as the pressing portion 13, and the setting angle is ±500°. As a result, the introduction angle is ±150°, and the result of the transmission loss is good. The meander angle is ±12°, and the drum winding length is 125% of that of Comparative Example 3.

In Example 5, two rollers are provided as the pressing portion 13, and the setting angle is ±350°. As a result, the introduction angle is ±150°, and the result of the transmission loss is good. The meander angle is ±1°, and the drum winding length is 160% of that of Comparative Example 3.

In Example 6, three rollers are provided as the pressing portion 13, and the setting angle is ±300°. As a result, the introduction angle is ±150°, and the result of the transmission loss is good. The meander angle is ±1°, and the drum winding length is 160% of that of Comparative Example 3.

In this way, in the optical fiber cables of Examples 4 to 6, the same performance as the optical fiber cables of Examples 1 to 3 can be obtained although they are optical fiber cables having a larger number of optical fibers than Examples 1 to 3. This is because the roller as the pressing portion 13 limits the untwisting of the optical fiber bundle B.

TABLE 2

| | roller | setting angle (°) | introduction angle (°) | transmission loss | meander angle (°) | drum winding length (%) | comprehensive judgement |
|---|---|---|---|---|---|---|---|
| Comparative Example 3 | — | ±1100 | ±150 | OK | ±33 | 100 | C |
| Comparative Example 4 | — | ±600 | ±70 | NG | ±1 | 160 | C |
| Example 4 | 1 | ±500 | ±150 | OK | ±12 | 125 | B |
| Example 5 | 2 | ±350 | ±150 | OK | ±1 | 160 | A |
| Example 6 | 3 | ±300 | ±150 | OK | ±1 | 160 | A |

As shown in Table 2, in Comparative Example 3, the roller as the pressing portion 13 is not provided, and the setting angle is ±1100°. As a result, the introduction angle is ±150°, the result of the transmission loss is good, and the meander angle is ±33°. Comparing Comparative Example 3 with Comparative Example 1 in Table 1, the introduction angles are equal, but the setting angle is larger in Comparative Example 3. This is because Comparative Example 3 has (1728-Fiber Cable)

Next, the results of manufacturing 1728-fiber optical fiber cables according to the manufacturing conditions of Comparative Examples 5, 6 and Examples 7 to 9 shown in Table 3 will be described. Here, 12 intermittently-adhered optical fiber ribbons each having 12 optical fibers are bound with a binding material to form one unit. An optical fiber cable having 12 units is manufactured. That is, the optical fiber bundle B is formed by SZ twisting of 12 optical fiber units. The other conditions are the same as those described in the description of Table 1.

As described above, the 1728-fiber high-density optical fiber cable is also manufactured by the manufacturing apparatus provided with the pressing portion 13, so the untwist-ing of the optical fiber bundle B can be limited, and the desired performance can be obtained.

TABLE 3

|  | roller | setting angle (°) | introduction angle (°) | transmission loss | meander angle (°) | drum winding length (%) | comprehensive judgement |
|---|---|---|---|---|---|---|---|
| Comparative Example 5 | — | ±1300 | ±150 | OK | ±45 | 100 | C |
| Comparative Example 6 | — | ±600 | ±30 | NG | ±1 | 180 | C |
| Example 7 | 1 | ±500 | ±150 | OK | ±15 | 120 | B |
| Example 8 | 2 | ±350 | ±150 | OK | ±1 | 180 | A |
| Example 9 | 3 | ±300 | ±150 | OK | ±1 | 180 | A |

As shown in Table 3, in Comparative Example 5, the roller as the pressing portion 13 is not provided, and the setting angle is ±1300°. As a result, the introduction angle is ±150°, the result of the transmission loss is good, and the meander angle is ±45°.

Next, the results of manufacturing the 1728-fiber optical fiber cable described above using the manufacturing apparatus 10B shown in FIG. 3 will be described using Table 4.

TABLE 4

|  | roller | setting angle (°) | introduction angle (°) | transmission loss | meander angle (°) | drum winding length (%) | comprehensive judgement |
|---|---|---|---|---|---|---|---|
| Comparative Example 7 | — | ±1300 | ±150 | OK | ±45 | 100 | C |
| Comparative Example 8 | — | ±600 | ±30 | NG | ±1 | 180 | C |
| Example 10 | 1 | ±400 | ±150 | OK | ±5 | 150 | A |
| Example 11 | 2 | ±300 | ±150 | OK | ±1 | 180 | A |
| Example 12 | 3 | ±200 | ±150 | OK | ±1 | 180 | A |

In Comparative Example 6, the roller as the pressing portion 13 is not provided, and the setting angle is ±600°. As a result, the introduction angle is ±30°, and the result of the transmission loss is insufficient. The meander angle is ±1°, and the drum winding length is 180% of that of Comparative Example 5.

In this way, in Comparative Examples 5, 6, a high-density optical fiber cable having 1728 optical fibers is manufactured by a manufacturing apparatus not having the pressing portion 13. Therefore, when the optical fiber bundle B is largely untwisted, meander occurs in the optical fiber cable or a desired introduction angle cannot be obtained.

On the other hand, in Example 7, one roller is provided as the pressing portion 13, and the setting angle is ±500°. As a result, the introduction angle is ±150°, and the result of the transmission loss is good. The meander angle is ±15°, and the drum winding length is 120% of that of Comparative Example 5.

In Example 8, two rollers are provided as the pressing portion 13, and the setting angle is ±350°. As a result, the introduction angle is ±150°, and the result of the transmission loss is good. The meander angle is ±1°, and the drum winding length is 180% of that of Comparative Example.

In Example 9, three rollers are provided as the pressing portion 13, and the setting angle is ±300°. As a result, the introduction angle is ±150°, and the result of the transmission loss is good. The meander angle is ±1°, and the drum winding length is 180% of that of Comparative Example 5.

Since Comparative Examples 7, 8 shown in Table 4 have the same conditions and results as Comparative Examples 5, 6 shown in Table 3, a description thereof will be omitted.

As shown in Table 4, in Example 10, one roller integrated with the forming device 20 is provided as the pressing portion 13, and the setting angle is ±400°. As a result, the introduction angle is ±150°, and the result of the transmission loss is good. The meander angle is ±5°, and the drum winding length is 150% of that of Comparative Example 7 (Comparative Example 5).

In Example 11, two rollers integrated with the forming device 20 are provided as the pressing portion 13, and the setting angle is ±300°. As a result, the introduction angle is ±150°, and the result of the transmission loss is good. The meander angle is ±1°, and the drum winding length is 180% of that of Comparative Example 7.

In Example 12, three rollers integrated with the forming device 20 are provided as the pressing portion 13, and the setting angle is ±200°. As a result, the introduction angle is ±150°, and the result of the transmission loss is good. The meander angle is ±1°, and the drum winding length is 180% of that of Comparative Example 7.

In this way, in Examples 10 to 12, the difference between the setting angle and the introduction angle is smaller than that in Examples 7 to 9, and the meander angle is limited. The reason will be discussed below.

In the pressing portion 13, the relative movement of the optical fibers twisted in an SZ manner is restricted by pressing the optical fiber bundle B, but this restriction force is weakened as the optical fiber bundle B is away from the pressing portion 13 to the downstream side. Therefore, the untwisting of the optical fiber bundle B is likely to occur at a position away from the pressing portion 13 to the downstream side. On the other hand, the extrusion molding device 14 covers the outer periphery of the optical fiber bundle B with the sheath 101, relative movement between the optical fibers in the sheath 101 can be more strongly restricted. From the above, by reducing the distance between the ribbon separation is likely to occur and the result is insufficient, so NG (defect) is described.

In "Judgement" shown in Table 5, OK (good) is described in a case where the results of transmission loss and ribbon separation are OK, and NG (defect) is described in a case of at least one NG in the result.

TABLE 5

| | D (mm) | d (mm) | pressing ratio R (%) | introduction angle (°) | transmission loss | ribbon separation | judgement |
|---|---|---|---|---|---|---|---|
| 1 | 8.4 | 8.4 | 0 | ±50 | NG | OK | NG |
| 2 | 8.4 | 7.8 | 7 | ±150 | OK | OK | OK |
| 3 | 8.4 | 6.2 | 26 | ±150 | OK | OK | OK |
| 4 | 8.4 | 3.2 | 62 | ±150 | OK | OK | OK |
| 5 | 8.4 | 2.4 | 71 | ±150 | OK | OK | OK |
| 6 | 8.4 | 1.5 | 82 | ±150 | OK | NG | NG | pressing portion 13 and the extrusion molding device 14, it is possible to effectively prevent the optical fiber bundle B from untwisting between the pressing portion 13 and the extrusion molding device 14. Then, in Examples 10 to 12, since the forming device 20 and the pressing portion 13 are integrally provided, compared with the case where they are not provided integrally (Examples 7 to 9), the distance between the pressing portion 13 and the extrusion molding device 14 is reduced.

From the above, better results are obtained in Examples 10 to 12 as compared with Examples 7 to 9. This is because the roller as the pressing portion 13 is integrally provided with the forming device 20, so the distance between the pressing portion 13 and the extrusion molding device 14 becomes short, and the untwisting of the optical fiber generated therebetween is kept small.

In addition, in a case where the feeding device of the tension member 7 or the rip cord 8 described above is provided between the forming device 20 and the extrusion molding device 14, the distance between the forming device 20 and the extrusion molding device 14 needs to be secured to some extent. Therefore, by providing the pressing portion 13 integrally with the forming device 20, it is desirable that the distance between the pressing portion 13 and the extrusion molding device 14 is as short as possible.

(Pressing Ratio)

Next, conditions of the inter-roller distance d and the bundle diameter D described above will be described. Here, as shown in Table 5, 432-fiber optical fiber cables are manufactured under conditions 1 to 6 in which the relationship between the inter-roller distance d and the bundle diameter D is changed. The 432-fiber optical fiber cable includes six units, each unit being formed by binding six intermittently-adhered optical fiber ribbons each having 12 optical fibers with a binding material.

In addition, the pressing ratio R shown in Table 5 is calculated by the following Expression (1).

$$R[\%] = 100 - d/D \times 100 \quad (1)$$

Further, ribbon separation shown in Table 5 indicates the degree of detachment of the bonded portion provided on the above-described intermittently-adhered optical fiber ribbon. Specifically, the number of detachment that the separation of the bonded portion occurs is checked in the intermittently-adhered optical fiber ribbon of 5 meters in length. When the number of detachments is 1 or less, the ribbon separation is less likely to occur and the result is good, so OK (good) is described, and when the number of detachment is 2 or more, As shown in Table 5, under conditions 1 to 6, the bundle diameter D is fixed at 8.4 mm, and the inter-roller distance d is changed in the range of 1.5 mm to 8.4 mm. Thereby, the pressing ratio R is changed in the range of 0% to 82%. In addition, the case where the pressing ratio R is 0% indicates a state in which the rollers 13a, 13b as the pressing portion 13 do not press the optical fiber bundle B.

In condition 1, as a result of setting the inter-roller distance d to 8.4 mm and the pressing ratio R to 0%, the introduction angle is ±50°, and the evaluation result of the transmission loss is insufficient. The evaluation result of the ribbon separation is good. As described above, the reason why the result of the transmission loss is insufficient is that the introduction angle is small.

In conditions 2 to 5, as a result of changing the inter-roller distance d in the range of 2.4 to 7.8 mm and the pressing ratio R in the range of 7% to 71%, the introduction angle becomes ±150° for all, and the evaluation results of the transmission loss and the ribbon separation are all good.

In condition 6, as a result of setting the inter-roller distance d to 1.5 mm and the pressing ratio R to 82%, the introduction angle is ±150°, and the evaluation result of the transmission loss is good. However, the evaluation result of the ribbon separation became insufficient. The reason why the evaluation result of the ribbon separation is insufficient is that the inter-roller distance d is excessively short with respect to the bundle diameter D, so the optical fiber bundle B is excessively compressed and a large force acts on the bonded portion of the intermittently-adhered optical fiber ribbon and the bonded portion is detached. From the above, it is desirable to set the pressing ratio R to be in a range of 7% to 71%.

As described above, according to the manufacturing method of an optical fiber cable of one or more embodiments, the optical fiber bundle B twisted in an SZ manner by the SZ twisting device 12 is pressed by the pressing portion 13 while the sheath 101 is provided on the outer periphery of the optical fiber bundle B by the extrusion molding device 14. By pressing the optical fiber bundle B as described above, it is possible to limit relative movement of the optical fibers 3 included in the optical fiber bundle B, the relative movement which occurs when the SZ twisting is released due to the rigidity of the optical fibers 3. Therefore, it is limited that the SZ twisting of the optical fiber bundle B is untwisted between the SZ twisting device 12 and the extrusion molding device 14, and it is possible to introduce the optical fiber bundle B into the extrusion molding device 14 while maintaining the SZ-twisted state. Therefore, for example, the SZ twisting of the optical fiber bundle B can be maintained without extremely increasing the setting angle of the SZ twisting device 12, and the occurrence of meandering in the optical fiber cable 100 can be limited.

Further, since the effect is obtained by the pressing portion 13, in one or more embodiments, the holding member for limiting untwisting is not wound around the optical fiber bundle B, for example. Therefore, the structure for winding the holding member can be omitted, and the manufacturing apparatus can have a simple configuration.

Further, by integrally providing the pressing portion 13 with the forming device 20, the distance between the pressing portion 13 and the extrusion molding device 14 is reduced, and the untwisting of the optical fiber bundle B generated in this section can be more reliably limited.

Further, by setting the pressing ratio R in the range of 7% to 71%, the effect of limiting untwisting by the pressing portion 13 can be exhibited. Further, in the case of using an intermittently-adhered optical fiber ribbon as the optical fiber unit 5, it is possible to limit that the intermittently-adhered optical fiber ribbon is excessively compressed by the pressing portion 13 and the bonded portion detaches.

Further, according to the manufacturing apparatus of an optical fiber cable of one or more embodiments, it becomes possible to realize easily the manufacturing method which exhibits the effect described above.

In addition, in a case where at least one rotary body (rollers 13a, 13b) is used as the pressing portion 13, it is possible to prevent the optical fiber 3 from being damaged. This is because even if the optical fiber bundle B flows downstream while being pressed by the pressing portion 13, the friction received from the pressing portion 13 can be limited.

It should be noted that the technical scope of the present invention is not limited to the above-described embodiments, and various modifications can be made without departing from the spirit of the present invention.

For example, in one or more embodiments, the SZ twisting device 12 twists the plurality of optical fiber units 5 in an SZ manner, but the present invention is not limited to this, and the SZ twisting device 12 may twist the plurality of optical fibers 3 in an SZ manner. That is, the optical fiber unit 5 is not configured, and the plurality of optical fibers 3 are directly SZ-twisted. Even in this case, the pressing portion 13 can limit the occurrence of untwisting in the optical fiber bundle B twisted in an SZ manner.

Further, in the above embodiments, the optical fiber bundle B is wrapped by the wrapping tube 6, but the present invention is not limited to this, and the wrapping tube 6 may not be provided on the outer periphery of the optical fiber bundle B. By omitting the forming device 20 for winding the wrapping tube 6, the distance between the pressing portion 13 and the extrusion molding device 14 is reduced, and the untwisting of the optical fiber bundle B generated in this section can be more reliably limited.

In addition, without departing from the spirit of the present invention, it is possible to appropriately replace the constituent elements in the above-described embodiments with well-known constituent elements, and the above-described embodiments and modification examples may be appropriately combined.

REFERENCE SIGNS LIST 3 optical fiber
5 optical fiber unit
6 wrapping tube
10A, 10B manufacturing apparatus of optical fiber cable
12 SZ twisting device
13 pressing portion
13a, 13b rotary body (roller)
14 extrusion molding device
20, 20A forming device
100 optical fiber cable
101 sheath
B optical fiber bundle Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical fiber cable manufacturing method using a manufacturing apparatus comprising an SZ twisting device, an extrusion molding device, and a pressing portion, the method comprising:
    twisting optical fibers or optical fiber units in an SZ manner using the SZ twisting device to form an optical fiber bundle;
    wrapping the optical fiber bundle with a wrapping tube using a forming device of the manufacturing apparatus; and
    covering the optical fiber bundle with a sheath using the extrusion molding device while pressing the optical fiber bundle using the pressing portion disposed between the SZ twisting device and the forming device.

2. The optical fiber cable manufacturing method according to claim 1, wherein
    the pressing portion is integrally provided with the forming device.

3. The optical fiber cable manufacturing method according to claim 1, wherein
    the pressing portion comprises a pair of rotary bodies that sandwich the optical fiber bundle, and $7 \leq 100 - d/D \times 100 \leq 71$ is satisfied, where D is a diameter of the optical fiber bundle before passing between the pair of rotary bodies, and
    d is a minor diameter of the optical fiber bundle passing between the pair of rotary bodies.

4. The optical fiber cable manufacturing method according to claim 1, wherein the twisting and the pressing are executed without adding a holding member around the optical fiber bundle between the twisting and the pressing.

5. A manufacturing apparatus of an optical fiber cable comprising:
    an SZ twisting device that twists optical fibers or optical fiber units in an SZ manner to form an optical fiber bundle;
    a pressing portion disposed downstream, in a direction of manufacturing of the optical fiber bundle, of the SZ twisting device and that presses the optical fiber bundle;
    a forming device that wraps the optical fiber bundle with a wrapping tube; and
    an extrusion molding device disposed downstream, in the direction of manufacturing of the optical fiber bundle, of the pressing portion and that covers the optical fiber bundle with a sheath, wherein
    the pressing portion is disposed between the SZ twisting device and the forming device.

6. The manufacturing apparatus according to claim 5, wherein the pressing portion comprises a rotary body.

7. The manufacturing apparatus according to claim 5, wherein
the pressing portion is integrally provided with the forming device.

8. The manufacturing apparatus according to claim 5, wherein the manufacturing apparatus does not comprise, between the SZ twisting device and the pressing portion, a device that adds a holding member around the optical fiber bundle.

9. The manufacturing apparatus according to claim 5, wherein
the pressing portion comprises a pair of rotary bodies that sandwich the optical fiber bundle, and $7 \leq 100 - d/D \times 100 \leq 71$ is satisfied, where D is a diameter of the optical fiber bundle before passing between the pair of rotary bodies, and
d is a minor diameter of the optical fiber bundle passing between the pair of rotary bodies.

\* \* \* \* \*